(12) United States Patent
Wu et al.

(10) Patent No.: US 12,166,242 B2
(45) Date of Patent: Dec. 10, 2024

(54) ELECTRODE PLATE, ELECTRODE ASSEMBLY, BATTERY CELL, BATTERY, AND ELECTRIC DEVICE

(71) Applicant: CONTEMPORARY AMPEREX TECHNOLOGY (HONG KONG) LIMITED, Hong Kong (CN)

(72) Inventors: Kai Wu, Ningde (CN); Yu Zhang, Ningde (CN); Zige Zhang, Ningde (CN); Zhengyuan Zhao, Ningde (CN); Jinsong Zhang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/653,972

(22) Filed: May 2, 2024

(65) Prior Publication Data

US 2024/0356174 A1 Oct. 24, 2024

Related U.S. Application Data

(63) Continuation of application No. PCT/CN2023/103368, filed on Jun. 28, 2023.

(30) Foreign Application Priority Data

Apr. 24, 2023 (CN) .......................... 202310445348.0

(51) Int. Cl.
*H01M 50/536* (2021.01)
*H01M 4/13* (2010.01)
*H01M 4/66* (2006.01)

(52) U.S. Cl.
CPC ........... *H01M 50/536* (2021.01); *H01M 4/13* (2013.01); *H01M 4/667* (2013.01)

(58) Field of Classification Search
CPC ..................................................... H01M 4/667
See application file for complete search history.

(56) References Cited

U.S. PATENT DOCUMENTS

2020/0388850 A1  12/2020  Park et al.
2022/0367880 A1* 11/2022  Horikawa ............... H01M 4/70

FOREIGN PATENT DOCUMENTS

| CN | 108336286 A | 7/2018 |
| CN | 210535760 U | 5/2020 |

(Continued)

OTHER PUBLICATIONS

The World Intellectual Property Organization (WIPO) International Search Report and Written Opinion for PCT/CN2023/103368 Nov. 30, 2023 20 Pages (including translation).

(Continued)

*Primary Examiner* — Stephan J Essex
(74) *Attorney, Agent, or Firm* — ANOVA LAW GROUP, PLLC

(57) ABSTRACT

An electrode plate includes a current collector. The current collector includes a conductive layer and an insulating layer. The conductive layer includes a tab portion. In thickness direction of the electrode plate, the conductive layer is provided at two opposite sides of the insulating layer. The insulating layer includes a first region and a second region, and in width direction of the electrode plate, at least one end of the first region is connected to the second region. Thickness of the second region is less than thickness of the first region, and the tab portion is at least partially disposed in the second region. The electrode plate further includes an active substance layer applied on a surface of the conductive layer facing away from the insulating layer. The tab portion is not coated with the active substance layer.

19 Claims, 6 Drawing Sheets

(56) References Cited

FOREIGN PATENT DOCUMENTS

| | | | |
|---|---|---|---|
| CN | 112259742 A * | 1/2021 | .............. B60L 50/64 |
| CN | 115000648 A | 9/2022 | |
| CN | 217691221 U | 10/2022 | |
| CN | 115425372 A | 12/2022 | |
| CN | 218414960 U | 1/2023 | |
| CN | 218867146 U | 4/2023 | |
| CN | 218867151 | 4/2023 | |
| CN | 116154416 A | 5/2023 | |
| JP | 2006128038 A | 5/2006 | |
| JP | 2016012541 A | 1/2016 | |
| JP | 2018107030 A | 7/2018 | |
| WO | 2016136550 A1 | 9/2016 | |
| WO | 2020200155 A1 | 10/2020 | |
| WO | 2022022324 | 2/2022 | |
| WO | 2023273990 A1 | 1/2023 | |

OTHER PUBLICATIONS

The China National Intellectual Property Administration (CNIPA) Notice to Grant of Invention Parent Right for Chinese Application No. 202310445348.0 May 24, 2023 8 Pages (including translation).

\* cited by examiner

ELECTRODE PLATE, ELECTRODE ASSEMBLY, BATTERY CELL, BATTERY, AND ELECTRIC DEVICE

CROSS-REFERENCE TO RELATED APPLICATIONS

This application is a continuation of International Application No. PCT/CN2023/103368, filed on Jun. 28, 2023, which claims priority to Chinese Patent Application No. 202310445348.0, filed on Apr. 24, 2023 and entitled "ELECTRODE PLATE, ELECTRODE ASSEMBLY, BATTERY CELL, BATTERY, AND ELECTRIC DEVICE", the entire contents of both of which are incorporated herein by reference.

TECHNICAL FIELD

This application relates to the field of battery technologies, and specifically to an electrode plate, an electrode assembly, a battery cell, a battery, and an electric device.

BACKGROUND

Batteries are widely used in portable electronic devices, electric transportation vehicles, electric tools, drones, energy storage devices, and other fields.

The battery includes an electrode assembly, and tabs of the electrode assembly result in poor reliability of the battery due to poor welding quality.

SUMMARY

Embodiments of this application provide an electrode plate, an electrode assembly, a battery cell, a battery, and an electric device, so as to improve welding quality of tabs of the battery, thereby improving reliability of the battery.

According to a first aspect, an embodiment of this application provides an electrode plate including a current collector and an active substance layer. The current collector includes a conductive layer and an insulating layer, where in thickness direction of the electrode plate, the conductive layer is provided at two opposite sides of the insulating layer. The insulating layer includes a first region and a second region, thickness of the second region being less than thickness of the first region, and in width direction of the electrode plate, at least one end of the first region being connected to the second region. The conductive layer includes a tab portion, the tab portion being at least partially disposed in the second region. The active substance layer is applied to a surface of the conductive layer facing away from the insulating layer, the tab portion being not coated with the active substance layer.

In the foregoing technical solution, with the tab portion of the conductive layer disposed in the second region with a smaller thickness, when individual tab portions of the electrode assembly formed using the electrode plate are welded, the tab portions at the two sides of the second region are more easily welded due to the smaller thickness of the second region, thereby achieving electrical connection between the two tab portions, reducing welding difficulty, and mitigating the risk caused by welding quality issues such as false welding of the tab portions due to the presence of the insulating layer, which is conducive to the improvement in the welding quality of the individual tab portions of the electrode assembly having the electrode plate and thereby the improvement in the reliability of the battery or battery cell having the electrode plate.

In some embodiments of the first aspect of this application, the insulating layer further includes a first transition zone, the first transition zone connecting the first region and the second region, and thickness of the first transition zone gradually decreasing in a direction from the first region to the second region.

In the foregoing technical solution, the provision of the first transition zone can reduce the risk of forming stress concentration between the first region and the second region, improving the fatigue life of the electrode plate and reducing the risk of breakage of the electrode plate.

In some embodiments of the first aspect of this application, the conductive layer further includes a coating portion, the coating portion being disposed in the first region; at least a portion of the active substance layer is applied to a side of the coating portion facing away from the first region; and thickness of the coating portion is less than thickness of the tab portion.

In the foregoing technical solution, the thickness of the coating portion is less than the thickness of the tab portion, which can compensate to a certain extent for the dimensional difference in which the thickness of the first region is greater than the thickness of the second region. This reduces the thickness difference at various positions of the current collector, which is conducive to improving the structural dimensional homogeneity of the current collector and thereby improving the quality of the electrode plate.

In some embodiments of the first aspect of this application, the conductive layer includes a coating portion, the coating portion being disposed in the first region; at least a portion of the active substance layer is applied to a side of the coating portion facing away from the first region; and a surface of the coating portion facing away from the first region and a surface of the tab portion facing away from the second region are co-planar.

In the foregoing technical solution, the surface of the coating portion facing away from the first region and the surface of the tab portion facing away from the second region are co-planar, so that the surface of the current collector in the thickness direction of the electrode plate is much flatter, facilitating the manufacturing and molding of the current collector.

In some embodiments of the first aspect of this application, the insulating layer further includes a first transition zone, the first transition zone connecting the first region and the second region, and thickness of the first transition zone gradually decreasing in a direction from the first region to the second region; and the conductive layer further includes a second transition zone, the second transition zone being disposed in the first transition zone, and thickness of the second transition zone gradually increasing in the direction from the first region to the second region.

In the foregoing technical solution, in the direction from the first region to the second region, the thickness of the first transition zone gradually decreases and the thickness of the second transition zone gradually increases, which can compensate for the thickness difference of the first transition zone with respect to the first region and the second region. This reduces the thickness difference at various positions of the current collector, which is conducive to improving the structural dimensional homogeneity of the current collector and thereby improving the quality of the electrode plate.

In some embodiments of the first aspect of this application, a surface of the second transition zone facing away from the first transition zone and a surface of the tab portion facing away from the second region are co-planar.

In the foregoing technical solution, the surface of the second transition zone facing away from the first transition zone and the surface of the tab portion facing away from the second region are co-planar, so that the surface of the current collector in the thickness direction of the electrode plate is much flatter, facilitating the manufacturing and molding of the current collector.

In some embodiments of the first aspect of this application, in the width direction of the electrode plate, two ends of the first region are connected to the second region.

In the foregoing technical solution, in the width direction of the electrode plate, two ends of the first region are connected to the second region, so that in manufacturing of the electrode plate, the current collector can be cut in the middle to synchronously manufacture two electrode plates, which is conducive to improving the production efficiency of preparing the electrode plate.

In some embodiments of the first aspect of this application, the conductive layer has a first surface facing away from the insulating layer, the first surface extending to two ends of the current collector along the width direction of the electrode plate; and in the thickness direction of the electrode plate, the first surfaces of the conductive layers at the two opposite sides of the insulating layer are parallel.

In the foregoing technical solution, the conductive layer has a first surface facing away from the insulating layer, the first surface extending to two ends of the current collector along the width direction of the electrode plate, which means that the first surface is planar, facilitating the manufacturing and molding and facilitating the application of the active substance layer on the first surface, thereby facilitating the manufacturing and molding of the electrode plate. The first surfaces of the conductive layers at the two opposite sides of the insulating layer are parallel, and the current collector is an equal-thickness structure, facilitating the manufacturing and molding of the current collector.

In some embodiments of the first aspect of this application, the conductive layer further includes a coating portion, the coating portion being disposed in the first region, and in the thickness direction of the electrode plate, the active substance layer is provided on a side of the coating portion, facing away from the insulating layer, of the conductive layer at the two sides of the insulating layer.

In the foregoing technical solution, the active substance layer is provided on a side of the coating portion, facing away from the insulating layer, of the conductive layer at the two sides of the insulating layer, which increases the amount of active substance of the electrode plate and is conducive to increasing the energy density of the battery or battery cell having the electrode plate.

In some embodiments of the first aspect of this application, when viewed from the thickness direction of the electrode plate, a projection of the active substance layer overlaps a projection of the second region.

In the foregoing technical solution, the projection of the active substance layer overlaps the projection of the second region in the thickness direction of the electrode plate, and in the width direction of the electrode plate, the active substance layer covers as much of the conductive layer as possible, which increases the amount of the active substance layer of the electrode plate and is conducive to increasing the energy density of the battery or battery cell.

In some embodiments of the first aspect of this application, thickness $H_1$ of the second region and thickness $L_1$ of the tab portion satisfy $H_1/L_1 \leq 5$.

In the foregoing technical solution, if $H_1/L_1 > 5$, an area of welding residue during welding of individual tab portions is relatively small, resulting in relatively poor welding stability and a less likelihood of false welding. Therefore, $H_1/L_1 \leq 5$, so that a relatively large area of welding residue can be left between two tab portions after tab portions at the two sides of the second region are welded, which makes the welding more stable and reduces the risk of welding quality issues such as false welding.

In some embodiments of the first aspect of this application, $H_1/L_1 \leq 1$.

In the foregoing technical solution, $H_1/L_1 \leq 1$, so that a larger area of welding residue is present after tab portions are welded, which further enhances the welding stability and further reduces the risk of welding quality issues such as false welding.

In some embodiments of the first aspect of this application, the conductive layer further includes a coating portion, the coating portion being disposed in the first region, and thickness $H_2$ of the first region and thickness $L_2$ of the coating portion satisfy $1 \leq H_2/L_2 \leq 50$.

In the foregoing technical solution, if $H_2/L_2 \leq 1$, under the condition that the thickness of the current collector is constant, the thickness of the first region is smaller with respect to the thickness of the coating portion, which makes the portion of the current collector including the first region have a weak strength. If $H_2/L_2 > 50$, the thickness of the coating portion is smaller with respect to the thickness of the first region, and it is difficult to make the conductive layer have a high current flow capability under the condition that the thickness of the current collector is constant. Therefore, $1 \leq H_2/L_2 \leq 50$, so that the current collector has a good strength and the conductive layer has a good current flow capability.

In some embodiments of the first aspect of this application, $2 \leq H_2 L_2 \leq 20$.

In the foregoing technical solution, $2 \leq H_2/L_2 \leq 20$, so that the current collector has a better strength and the conductive layer has a better current flow capability.

According to a second aspect, an embodiment of this application provides an electrode assembly, the electrode assembly including the electrode plate according to any one of the embodiments of the first aspect.

In the foregoing technical solution, the tab portions at the two sides of the second region are more easily welded due to the smaller thickness of the second region of the insulating layer of the electrode plate provided in the embodiments of the first aspect, thereby reducing welding difficulty, and mitigating the risk caused by welding quality issues such as false welding of the tab portions due to the presence of the insulating layer, which is conducive to the improvement in the welding quality of the individual tab portions of the electrode assembly having the electrode plate.

In some embodiments of the second aspect of this application, the electrode assembly includes two electrode plates according to any one of the embodiments of the first aspect, with polarities of the two electrode plates being opposite.

In the foregoing technical solution, the tab portions at the two sides of the second region are more easily welded due to the smaller thickness of the second region of the insulating layer of the electrode plate provided in the embodiments of the first aspect, thereby reducing welding difficulty, and mitigating the risk caused by welding quality issues such as false welding of the tab portions due to the presence of the insulating layer. The two electrode plates of the electrode assembly with opposite polarities are both the electrode plates according to any one of the embodiments of the first aspect, so that the individual tab portions of the electrode assembly establish a relatively stable electrical connection with one another.

According to a third aspect, an embodiment of this application provides a battery cell, the battery cell including the electrode assembly according to any one of the embodiments of the second aspect.

In the foregoing technical solution, the welding of the tab portions of the electrode assembly can establish a stable electrical connection, thereby facilitating stable charging and discharging of the battery cell and improving the reliability of the battery cell.

In some embodiments of the third aspect, the battery cell further includes an adapter, and in thickness direction of the electrode plate, the tab portions of the conductive layer located at two sides of the second region are welded to the adapter.

In the foregoing technical solution, the tab portions of the conductive layer located at the two sides of the second region are welded to the adapter, thereby achieving electrical connection between the tab portions at the two sides of the second region. It can be understood that the tab portions at the two sides of the second region are all electrically connected to the adapter, and electrodes of the battery cell are led out through the adapter, which facilitates charging and discharging of the battery cell.

According to a fourth aspect, an embodiment of this application provides a battery, the battery including the battery cell according to any one of the embodiments of the third aspect.

In the foregoing technical solution, the welding of the tab portions of the electrode assembly of the battery cell according to the embodiment of the second aspect can establish a stable electrical connection, thereby facilitating stable charging and discharging of the battery cell and improving the reliability of the battery having the battery cell.

According to a fifth aspect, an embodiment of this application provides an electric device, the electric device including the battery according to the embodiment of the fourth aspect.

In the foregoing technical solution, the battery according to the embodiment of the fourth aspect has better reliability, which is conducive to improving the reliability of power consumption of the electric device powered by the battery.

BRIEF DESCRIPTION OF DRAWINGS

To describe the technical solutions of the embodiments of this application more clearly, the following briefly describes the accompanying drawings required for describing the embodiments. It is appreciated that the accompanying drawings below show merely some embodiments of this application and thus should not be considered as limitations on the scope. Persons of ordinary skill in the art may still derive other related drawings from the accompanying drawings without creative efforts.

Figure 1:
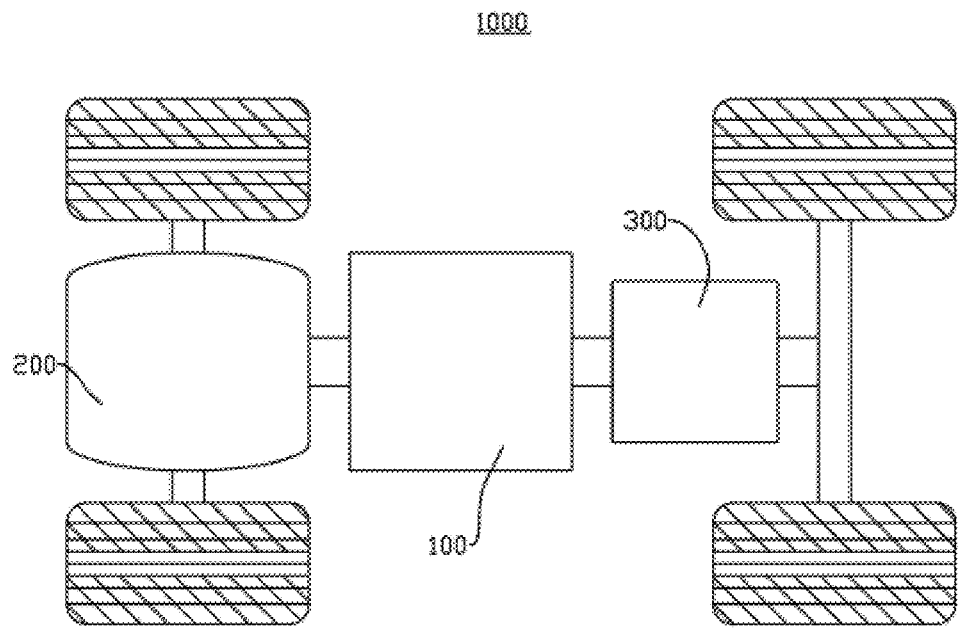
FIG. 1 is a schematic structural diagram of a vehicle according to some embodiments of this application.

Reference signs: 1000. vehicle; 100. battery; 10. box; 11. first portion; 12. second portion; 20. battery cell; 21. end cover; 211. electrode terminal; 22. housing; 23. electrode assembly; 231. electrode plate; 2311. current collector; 23111. conductive layer; 231111. tab portion; 231112. coating portion; 231113. first sub surface; 231114. second sub surface; 231115. second transition zone; 231126. third sub surface; 231117. first surface; 23112. insulating layer; 231121. first region; 231122. second region; 231123. first transition zone; 2312. tab; 2313. active substance layer; 24. adapter; 241. first sub adapter; 242. second sub adapter; 200. controller; 300. motor; X. width direction of an electrode plate; Y thickness direction of an electrode plate; and Z. length direction of an electrode plate.

DESCRIPTION OF EMBODIMENTS

To make the objectives, technical solutions, and advantages of the embodiments of this application clearer, the following clearly and completely describes the technical solutions in the embodiments of this application with reference to the accompanying drawings in the embodiments of this application. Apparently, the described embodiments are some but not all embodiments of this application. Generally, the components of the embodiments of this application as described and illustrated in the accompanying drawings herein can be arranged and designed in a variety of configurations.

Therefore, the following detailed description of the embodiments of this application as provided in the accompanying drawings is not intended to limit the scope of this application but merely to represent selected embodiments of this application. All other embodiments obtained by persons of ordinary skill in the art based on the embodiments of this application without creative efforts shall fall within the protection scope of this application.

It should be noted that, without conflict, the embodiments and features in the embodiments in this application may be combined with each other.

It should be noted that similar reference numerals and letters indicate similar items in the following drawings, and therefore once an item is defined in one drawing, it does not need to be further defined or explained in the subsequent drawings.

Currently, from a perspective of the market development, application of traction batteries is being more extensive. Traction batteries have been not only used in energy storage power supply systems such as hydroelectric power plants, thermal power plants, wind power plants, and solar power plants, but also widely used in many other fields including electric transportation tools such as electric bicycles, electric motorcycles, and electric vehicles, military equipment, and aerospace. With continuous expansion of application fields of traction batteries, market demands for the traction batteries are also expanding.

The battery mentioned in the embodiments of this application is a single physical module that includes one or more battery cells for providing a higher voltage and capacity. For example, the battery mentioned in this application may include a battery module, a battery pack, or the like. A battery typically includes a box configured to enclose one or more battery cells. The box can prevent liquids or other foreign matter from affecting charging or discharging of the battery cell.

In this application, the battery cell may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application. The battery cell may be cylindrical, flat, cuboid, or of other shapes, which is not limited in the embodiments of this application either. Battery cells are typically divided into three types by packaging method: cylindrical cell, prismatic cell, and pouch cell. The type of battery is not limited in the embodiments of this application either.

The battery cell includes an electrode assembly and an electrolyte, and the electrode assembly includes a separator and two electrode plates with opposite polarities. The two electrode plates with opposite polarities are a positive electrode plate and a negative electrode plate. The battery cell mainly relies on movement of metal ions between a positive electrode plate and a negative electrode plate to work. The electrode plate includes a current collector and an active substance layer. The active substance layer is applied to a surface of the current collector. A current collector coated with the active substance layer protrudes from a current collector coated with the active substance layer and serves as a tab of the electrode plate. Tabs of the electrode plate with the same polarity are welded for charging and discharging a battery cell.

To improve the strength of the current collector and the reliability of the battery cell, a composite current collector may be used, the composite current collector including a conductive layer and an insulating layer. In thickness direction of the electrode plate, the conductive layer is provided at two opposite sides of the insulating layer, and the active substance layer is applied to a side of the conductive layer facing away from the insulating layer. In width direction of the electrode plate, a region of the current collector not coated with the active substance layer forms a tab of the electrode plate. Two conductive layers are insulated from each other by an insulating layer, and two conductive layers at a tab cannot be directly communicated, that is, cannot be directly electrically connected. Therefore, it is possible to achieve communication between two conductive layers at the tab by welding adapters at the tab, and then the adapters corresponding to the individual tabs are welded to establish electrical connections in the individual tabs. However, this results in two interconnect welding procedures with high process complexity and difficult process control. In some other cases, to alleviate the problems of high process complexity and difficult process control caused by the two interconnect welding processes, a plurality of tabs of an electrode plate with the same polarity can be directly welded as a whole to the adapter, so that there is only one interconnect welding process, which can reduce the manufacturing costs of battery cells.

Regardless of one interconnect welding process or two interconnect welding procedures, since the current collector is a composite current collector and the tab includes an insulating layer, when the tab is welded to the adapter or the tabs are welded together, the insulating layer is equivalent to an impurity, which increases welding difficulty and may lead to quality issues such as false welding during welding.

Based on the above considerations, to alleviate the problems of great welding difficulty and poor welding quality of the electrode plate at the tabs caused by the insulating layer of the current collector, an embodiment of this application provides an electrode plate. The electrode plate includes a current collector, the current collector including a conductive layer and an insulating layer. The conductive layer includes a tab portion not coated with an active substance layer. In thickness direction of the electrode plate, the conductive layer is provided at two opposite sides of the insulating layer. The insulating layer includes a first region and a second region, and in width direction of the electrode plate, at least one end of the first region is connected to the second region. Thickness of the second region is less than thickness of the first region, and the tab portion is disposed in the second region.

With the tab portion of the conductive layer disposed in the second region with a smaller thickness, when individual tab portions of the electrode assembly formed using the electrode plate are welded, the tab portions at the two sides of the second region are more easily welded due to the smaller thickness of the second region, thereby achieving electrical connection between the two tab portions, reducing welding difficulty, and mitigating the risk caused by welding quality issues such as false welding of the tab portions due to the presence of the insulating layer, which is conducive to the improvement in the welding quality of the individual tab portions of the electrode assembly having the electrode plate.

The electrode plate disclosed in this embodiment of this application can be used for manufacturing a battery cell. The battery cell having the electrode plates provided in this embodiment of this application can be used in, but is not limited to, electric devices such as vehicles, ships, or aircrafts. A power supply system of the electric device can be formed using the battery cell, battery, or the like manufactured or molded with the electrode plate disclosed in this application. This helps to alleviate the problem of poor welding quality of the tabs of the battery and to improve the reliability of the battery.

An embodiment of this application provides an electric device that uses a battery as a power source. The electric device may be but is not limited to a mobile phone, a tablet, a notebook computer, an electric toy, an electric tool, an electric bicycle, an electric car, a ship, or a spacecraft. The electric toy may be a fixed or mobile electric toy, for example, a game console, an electric toy car, an electric toy ship, and an electric toy airplane. The spacecraft may include an airplane, a rocket, a space shuttle, a spaceship, and the like.

Referring to FIG. 1, FIG. 1 is a schematic structural diagram of the vehicle 1000 according to some embodiments of this application. The vehicle 1000 may be a fuel vehicle, a gas vehicle, or a new energy vehicle, where the new energy vehicle may be a battery electric vehicle, a hybrid electric vehicle, a range-extended vehicle, or the like. The vehicle 1000 is provided with a battery 100 inside, and the battery 100 may be disposed at the bottom, front, or rear of the vehicle 1000. The battery 100 may be configured to supply power to the vehicle 1000. For example, the battery 100 may be used as an operational power source for the vehicle 1000. The vehicle 1000 may further include a controller 200 and a motor 300, where the controller 200 is configured to control the battery 100 to supply power to the motor 300, for example, to satisfy power needs of start, navigation, and driving of the vehicle 1000.

In some embodiments of this application, the battery 100 can be used as not only the operational power source for the vehicle 1000 but also a driving power source for the vehicle 1000, replacing or partially replacing fossil fuel or natural gas to provide driving traction for the vehicle 1000.

Figure 2:
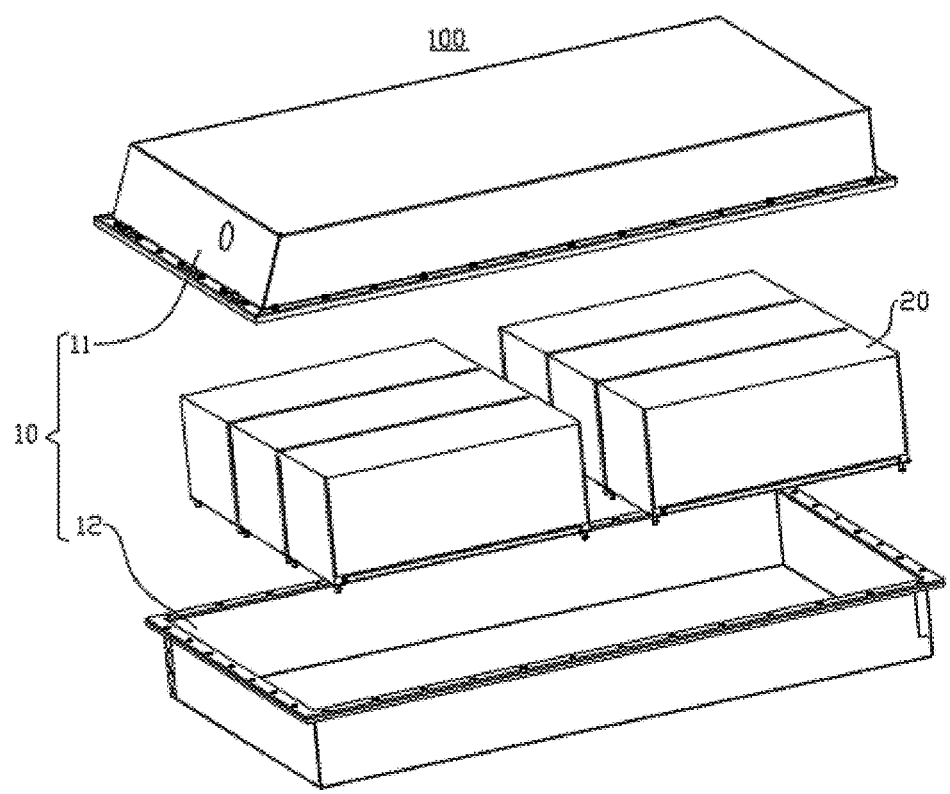
FIG. 2 is an exploded view of a battery according to some embodiments of this application.

Referring to FIG. 2, FIG. 2 is an exploded view of a battery 100 according to some embodiments of this application. The battery 100 includes a box 10 and a battery cell 20, where the battery cell 20 is accommodated in the box 10. The box 10 is configured to provide an accommodating space for the battery cell 20. The box 10 may be a variety of structures. In some embodiments, the box 10 may include a first portion 11 and a second portion 12. The first portion 11 and the second portion 12 fit together so that the first portion 11 and the second portion 12 jointly define a space for accommodating the battery cell 20. The second portion 12 may be a hollow structure with one end open, and the first portion 11 may be a plate structure, where the first portion 11 covers the open side of the second portion 12 for the first portion 11 and the second portion 12 to jointly define an accommodating space. Alternatively, the first portion 11 and the second portion 12 may both be hollow structures with one side open, where the open side of the first portion 11 is engaged with the open side of the second portion 12. Certainly, the box 10 formed by the first portion 11 and the second portion 12 may have a variety of shapes, for example, cylinder or cuboid.

In the battery 100, a plurality of battery cells 20 may be provided, and the plurality of battery cells 20 may be connected in series, parallel, or series-parallel, where being connected in series-parallel means a combination of series and parallel connections of the plurality of battery cells 20. The plurality of battery cells 20 may be directly connected in series, parallel, or series-parallel, and then an entirety of the plurality of battery cells 20 is accommodated in the box 10; or certainly, the battery 100 may be formed by a plurality of battery cells 20 connected in series, parallel, or series-parallel first to form a battery module and then a plurality of battery modules being connected in series, parallel, or series-parallel to form an entirety which is accommodated in the box 10. The battery 100 may further include other structures. For example, the battery 100 may further include a busbar configured to implement electrical connection between the plurality of battery cells 20.

Each battery cell 20 may be a secondary battery or a primary battery, and may be a lithium-sulfur battery, a sodium-ion battery, or a magnesium-ion battery, without being limited thereto. The battery cell 20 may be cylindrical, flat, cuboid, or of other shapes.

Figure 3:
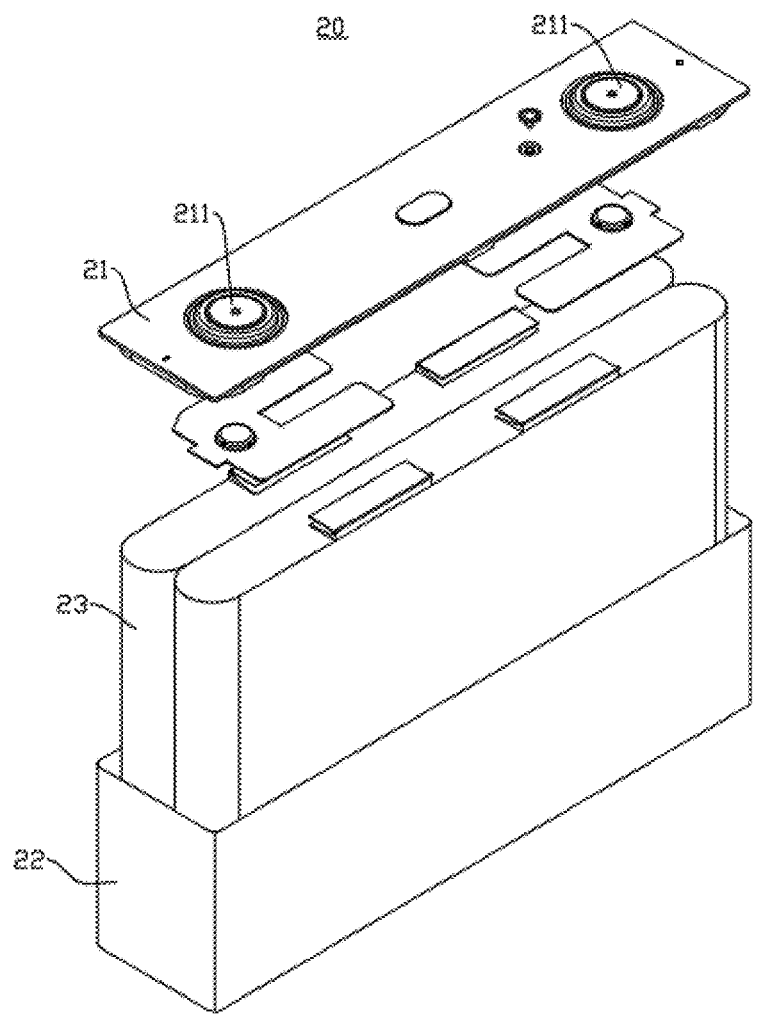
FIG. 3 is a schematic structural exploded view of a battery cell according to some embodiments of this application.

Referring to FIG. 3, FIG. 3 is a schematic structural exploded view of a battery cell 20 according to some embodiments of this application. The battery cell 20 refers to a smallest element constituting the battery 100. As shown in FIG. 3, the battery cell 20 includes an end cover 21, a housing 22, an electrode assembly 23, and other functional components.

The end cover 21 refers to a component that covers an opening of the housing 22 to separate an internal environment of the battery cell 20 from an external environment. A shape of the end cover 21 is not limited and may be adapted to a shape of the housing 22 to fit the housing 22. Optionally, the end cover 21 may be made of a material with specified hardness and strength (for example, aluminum alloy), so that the end cover 21 is less likely to deform when subjected to extrusion and collision, allowing the battery cell 20 to have higher structural strength and enhanced reliability. The end cover 21 may be provided with functional components such as an electrode terminal 211. The electrode terminal 211 may be configured to be electrically connected to the electrode assembly 23 for outputting or inputting electrical energy of the battery cell 20. In some embodiments, the end cover 21 may further be provided with a pressure relief mechanism for releasing internal pressure when the internal pressure or a temperature of the battery cell 20 reaches a threshold. The end cover 21 may also be made of various materials, such as copper, iron, aluminum, stainless steel, aluminum alloy, and plastic, which are not particularly limited in the embodiments of this application. In some embodiments, an insulation part may also be provided at an inner side of the end cover 21. The insulation part may be configured to isolate an electrically connected component in the housing 22 from the end cover 21 to reduce a risk of short circuit. For example, the insulation part may be made of plastic, rubber, or the like.

The housing 22 is an assembly configured to form an internal environment of the battery cell 20 together with the end cover 21, where the formed internal environment may be configured to accommodate the electrode assembly 23, an electrolyte, and other components. The housing 22 and the end cover 21 may be separate components, an opening may be provided on the housing 22, and the end cover 21 covers the opening to form the internal environment of the battery cell 20. The end cover 21 and the housing 22 are not limited and may also be integrated. Specifically, the end cover 21 and the housing 22 may form a shared connection surface before other components are disposed inside the housing, and then the housing 22 is covered with the end cover 21 when inside of the housing 22 needs to be enclosed. The housing 22 may be of various shapes and sizes, such as a rectangular shape, a cylindrical shape, and a hexagonal prism shape. Specifically, a shape of the housing 22 may be determined according to a specific shape and size of the electrode assembly 23. The housing 22 may be made of various materials, such as copper, iron, aluminum, stainless steel, aluminum alloy, and plastic, which are not particularly limited in the embodiments of this application.

The electrode assembly 23 is a component in which electrochemical reactions occur in the battery cell 20. The housing 22 may include one or more electrode assemblies 23. The electrode assembly 23 is mainly formed by winding or stacking two electrode plates 231 with opposite polarities, and a separator is generally provided between the two electrode plates 231 with opposite polarities. The separator may be made of PP (polypropylene, polypropylene), PE (polyethylene, polyethylene), or the like.

Portions of the two electrode plates 231 with opposite polarities that have an active substance constitutes a body portion of the electrode assembly 23, while portions of the two electrode plates 231 with opposite polarities that have no active substance separately constitute a tab 2312, which means that portions of the two electrode plates 231 with opposite polarities that have no active substance constitute a positive electrode tab and a negative electrode tab, respectively. A positive electrode tab and a negative electrode tab may both be located at one end of the body portion or be located at two ends of the body portion, respectively. During charging and discharging of the battery 100, a positive electrode active substance and a negative electrode active substance react with an electrolyte, and the tabs 2312 are connected to electrode terminals 211 to form a current loop.

Figure 4:
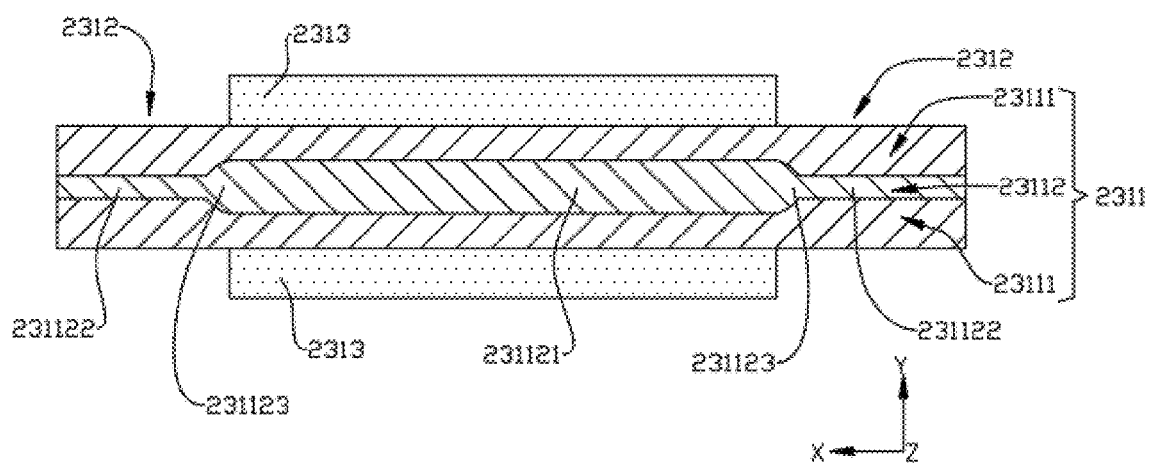
FIG. 4 is a schematic structural diagram of an electrode plate according to some embodiments of this application.
Figure 5:
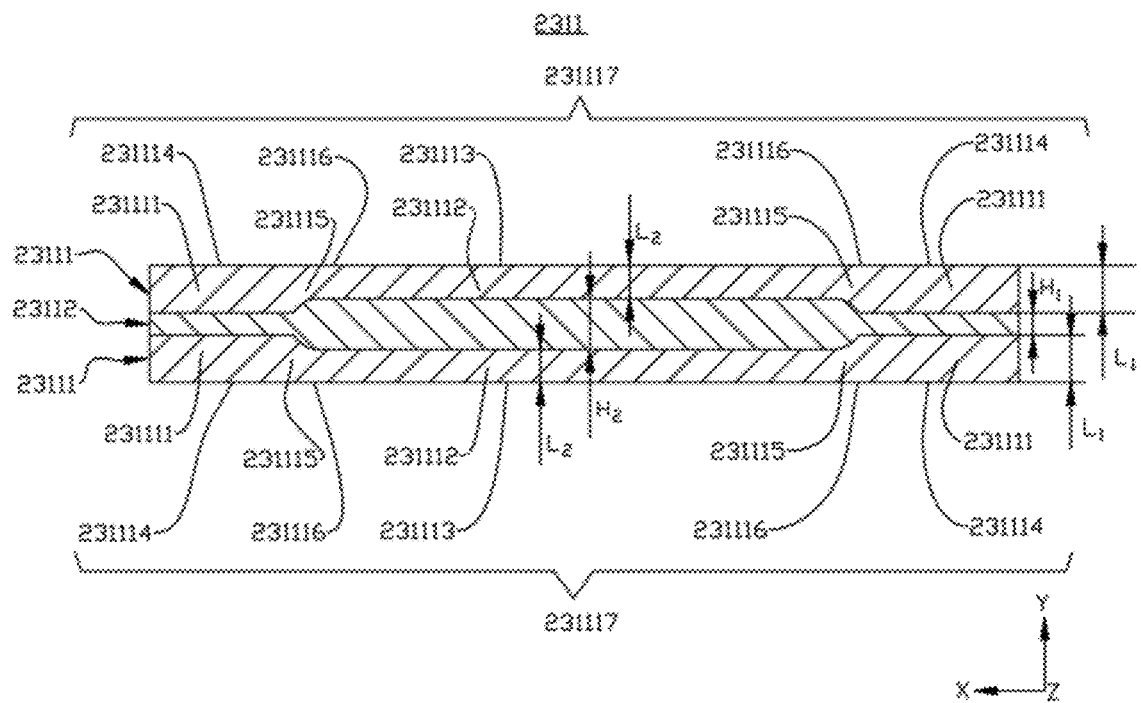
FIG. 5 is a schematic structural diagram of a current collector of an electrode plate according to some embodiments of this application.

As shown in FIG. 4 and FIG. 5, in some embodiments, the electrode plate 231 includes a current collector 2311 and an active substance layer 2313. The current collector 2311 includes a conductive layer 23111 and an insulating layer 23112, where in thickness direction Y of the electrode plate, the conductive layer 23111 is provided at two opposite sides of the insulating layer 23112; the insulating layer 23112 includes a first region 231121 and a second region 231122, thickness of the second region 231122 being less than thickness of the first region 231121, and in width direction X of the electrode plate, at least one end of the first region 231121 being connected to the second region 231122; and the conductive layer 23111 includes a tab portion 231111, the tab portion 231111 being at least partially disposed in the second region 231122. The active substance layer 2313 is applied to a surface of the conductive layer 23111 facing away from the insulating layer 23112, the tab portion 231111 being not coated with the active substance layer 2313.

The active substance layer 2313 is made of different materials based on the polarity of the electrode plate 231. For example, under the condition that the electrode plate 231 is a positive electrode plate, the active substance layer 2313 may be lithium cobaltate, lithium iron phosphate, lithium ternary, lithium manganate, or the like. If the electrode plate 231 is a negative electrode plate, the active substance layer 2313 may be carbon, silicon, or the like.

The current collector 2311 includes an insulating layer 23112 and two conductive layers 23111, and in thickness direction Y of the electrode plate, the two conductive layers 23111 are disposed at two sides of the insulating layer 23112, respectively. The conductive layers 23111 may be bonded to a surface of the insulating layer 23112 in the thickness direction Y of the electrode plate, or may be disposed on a side of the insulating layer 23112 in the thickness direction Y of the electrode plate using other connection methods, such as fusion bonding. Depending on the polarity of the electrode plate 231, materials for the conductive layer 23111 may be different. For example, if the electrode plate 231 is a positive electrode plate, the conductive layer 23111 may be made of aluminum, and if the electrode plate 231 is a negative electrode plate, the conductive layer 23111 may be made of copper.

The material of the insulating layer 23112 includes at least one of polyethylene terephthalate or polypropylene. The first region 231121 and the second region 231122 are arranged along the width direction X of the electrode plate, and an end of the first region 231121 is connected to an end of the second region 231122. The first region 231121 and the second region 231122 may be directly or indirectly connected. The width direction X of the electrode plate is perpendicular to the thickness direction Y of the electrode plate.

The first region 231121 may be an equal-thickness structure or a non-equal-thickness structure. The second region 231122 may be an equal-thickness structure or a non-equal-thickness structure.

The thickness of the first region 231121 may be the smallest dimension of the first region 231121 in the thickness direction Y of the electrode plate, and the thickness of the second region 231122 may be the largest dimension of the second region 231122 in the thickness direction Y of the electrode plate. In other words, the smallest dimension of the first region 231121 in the thickness direction Y of the electrode plate is greater than the largest dimension of the second region 231122 in the thickness direction Y of the electrode plate.

Each conductive layer 23111 has a tab portion 231111. The second region 231122 and the tab portions 231111, disposed in the second region 231122, of the two conductive layers 23111 together form the tabs 2312 of the electrode plate 231. The conductive layer 23111 may include a plurality of tab portions 231111 spaced apart in length direction Z of the electrode plate, and the insulating layer 23112 may include a plurality of second regions 231122 spaced apart in the length direction Z of the electrode plate, such that the electrode plate 231 may form a plurality of tabs 2312 spaced apart in the length direction Z of the electrode plate. The thickness direction Y of the electrode plate, the width direction X of the electrode plate, and the length direction Z of the electrode plate are perpendicular to each other.

When an electrode assembly 23 is manufactured using the electrode plate 231, the plurality of tabs 2312 are stacked and welded. The plurality of tabs 2312 are stacked and welded so that the tab portions 231111 at two sides of each tab 2312 in the thickness direction Y of the electrode plate are communicated and electrically connected. It is possible to achieve communication between two tab portions 231111 at the tab 2312 by welding an adapter (not shown in the figure) at each tab, and then the adapters corresponding to the individual tabs 2312 are welded to establish electrical connections in the individual tabs 2312. It is also possible to weld the plurality of tabs 2312 of an electrode plate 231 with the same polarity as a whole directly to the adapter, so that there is only one interconnect welding process, which can reduce the manufacturing costs of battery cells 20. The adapters may be electrically connected to the electrode terminals 211 on the end cover 21.

In the width direction X of the electrode plate, the tab portions 231111 may be disposed in the second region 231122 in its entirety. When viewed from the thickness direction Y of the electrode plate, a region at which the conductive layer 23111 overlaps the second region 231122 is the tab portion 231111. In the width direction X of the electrode plate, the tab portion 231111 may be partially disposed in the second region 231122.

With the tab portion 231111 of the conductive layer 23111 disposed in the second region 231122 with a smaller thickness, when individual tab portions 231111 of the electrode assembly 23 formed using the electrode plate 231 are welded, the tab portions 231111 at the two sides of the second region 231122 are more easily welded due to the smaller thickness of the second region 231122, thereby achieving electrical connection between the two tab portions 231111, reducing welding difficulty, and mitigating the risk caused by welding quality issues such as false welding of the tab portions 231111 due to the presence of the insulating layer 23112, which is conducive to the improvement in the welding quality of the individual tab portions 231111 of the electrode assembly 23 having the electrode plate 231 and thereby the improvement in the reliability of the battery 100 or battery cell 20 having the electrode plate 231.

In some embodiments, the insulating layer 23112 further includes a first transition zone 231123, the first transition zone 231123 connecting the first region 231121 and the second region 231122, and thickness of the first transition zone 231123 gradually decreasing in a direction from the first region 231121 to the second region 231122.

In the width direction X of the electrode plate, an end of the first transition zone 231123 is connected to the first region 231121, and another end of the first transition zone 231123 is connected to the second region 231122. The first region 231121 and the second region 231122 are indirectly connected through the first transition zone 231123. Two surfaces of the first transition zone 231123 in the thickness direction Y of the electrode plate may be curved surfaces or may be planar surfaces inclined from the first region 231121 to the second region 231122.

The first region 231121, the second region 231122, and the first transition zone 231123 may be provided separately and connected together using a connection process such as bonding connection and fusion connection, to form the insulating layer 23112. The first region 231121, the second region 231122, and the first transition zone 231123 may alternatively be integrally formed. Materials of the first region 231121, the second region 231122, and the first transition zone 231123 may be the same or different.

In the direction from the first region 231121 to the second region 231122, the thickness of the first transition zone 231123 gradually decreases. In other words, in the width direction X of the electrode plate, the first transition zone 231123 has a smaller thickness at a position closer to the second region 231122.

The provision of the first transition zone 231123 can reduce the risk of forming stress concentration between the first region 231121 and the second region 231122, improving the fatigue life of the electrode plate 231 and reducing the risk of breakage of the electrode plate 231.

Figure 6:
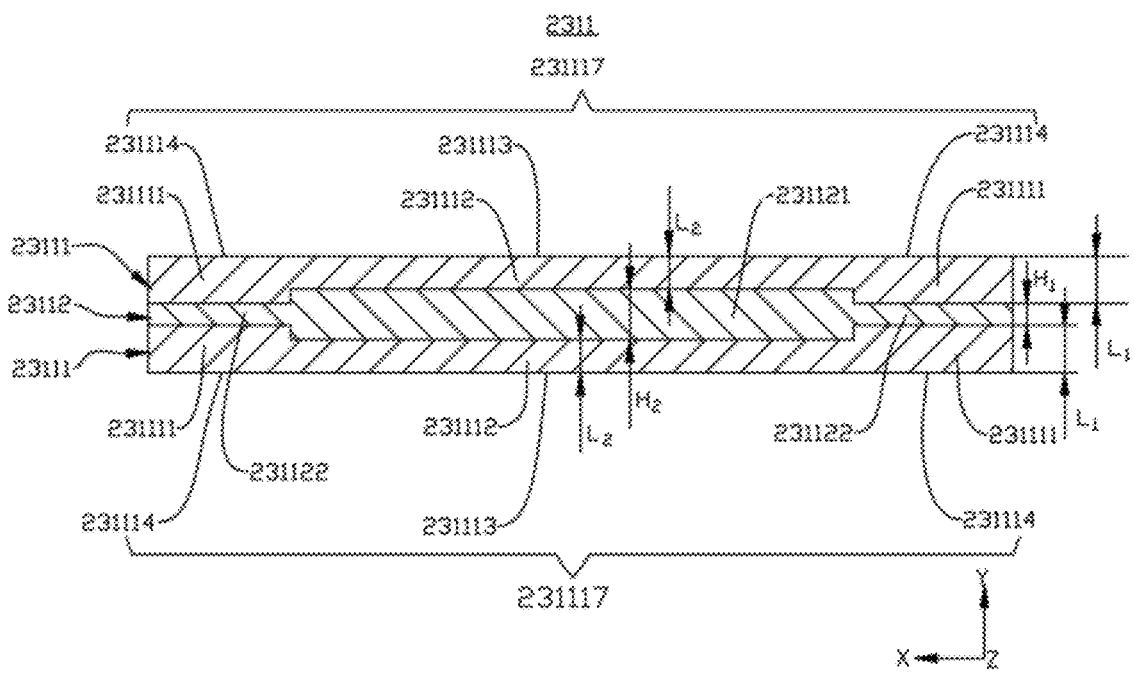
FIG. 6 is a schematic structural diagram of a current collector of an electrode plate according to some other embodiments of this application.

In an embodiment in which the first region 231121 and the second region 231122 are directly connected, as shown in FIG. 6, a thickness difference can be formed at the connection position between the first region 231121 and the second region 231122, which means that the thickness of the end of the first region 231121 connected to the second region 231122 is greater than the thickness of the end of the second region 231122 connected to the first region 231121.

Figure 7:
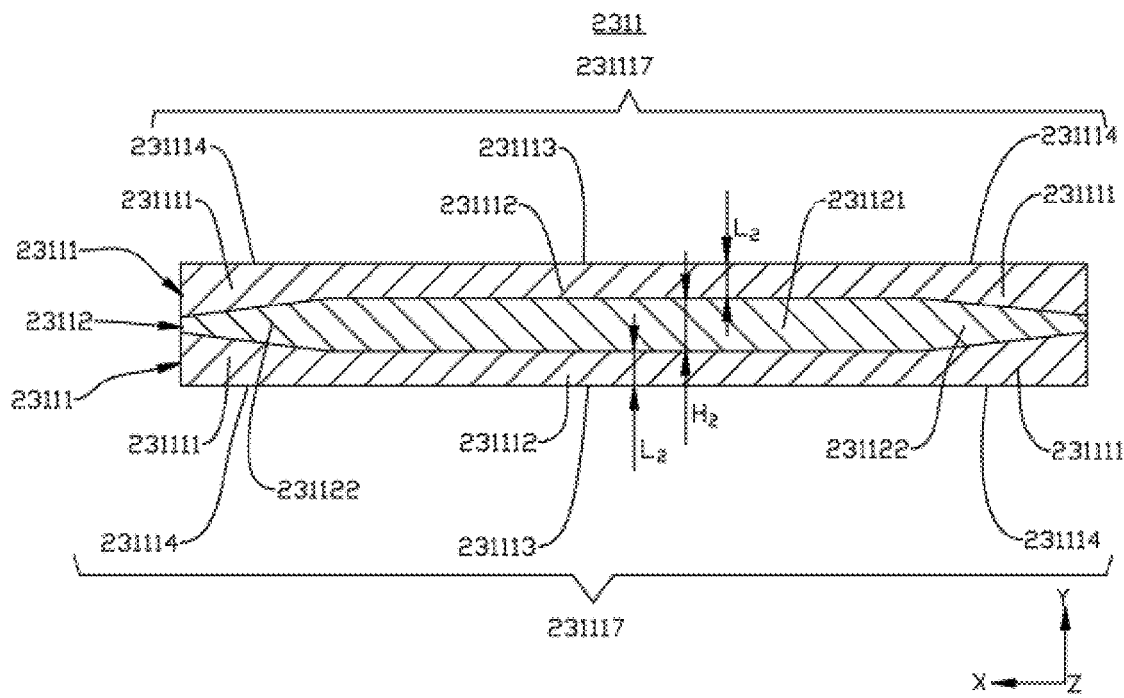
FIG. 7 is a schematic structural diagram of a current collector of an electrode plate according to yet some other embodiments of this application.

Certainly, in the embodiment in which the first region 231121 and the second region 231122 are directly connected, as shown in FIG. 7, the thickness of the end of the second region 231122 connected to the first region 231121 may alternatively be substantially the same as the thickness of the end of the first region 231121 connected to the second region 231122. In the direction from the first region 231121 to the second region 231122, the thickness of the second region 231122 gradually decreases, so that there is less risk of forming stress concentration under the condition that the first region 231121 and the second region 231122 are directly connected, which is conducive to improving the fatigue life of the electrode plate 231 and reducing the risk of breakage of the electrode plate 231.

In some embodiments, the conductive layer 23111 further includes a coating portion 231112, the coating portion 231112 being disposed in the first region 231121; at least a portion of the active substance layer 2313 is applied to a side of the coating portion 231112 facing away from the first region 231121; and thickness of the coating portion 231112 is less than thickness of the tab portion 231111.

The coating portion 231112 and the tab portion 231111 are disposed in the width direction X of the electrode plate. An end of the coating portion 231112 is connected to an end of the tab portion 231111, and the coating portion 231112 and the tab portion 231111 are electrically connected. In this regard, the coating portion 231112 and the tab portion 231111 may be directly or indirectly connected.

The coating portion 231112 is configured for application of an active substance layer 2313 (shown in FIG. 4). In the thickness direction Y of the electrode plate, the active substance layer 2313 is applied to the side of the coating portion 231112 facing away from the first region 231121. For the same conductive layer 23111, the active substance layer 2313 applied to the side of the conductive layer 23111 facing away from the insulating layer 23112 may be entirely applied to the coating portion 231112, or a portion of the active substance layer 2313 applied to the side of the conductive layer 23111 facing away from the insulating layer 23112 may be applied to the coating portion 231112, and another portion thereof is applied beyond the coating portion 231112 in the width direction X of the electrode plate.

The coating portion 231112 may be an equal-thickness structure or a non-equal-thickness structure. The tab portion 231111 may be an equal-thickness structure or a non-equal-thickness structure.

The thickness of the coating portion 231112 may be the largest dimension of the coating portion 231112 in the thickness direction Y of the electrode plate, and the thickness of the tab portion 231111 may be the smallest dimension of the tab portion 231111 in the thickness direction Y of the electrode plate. In other words, the largest dimension of the coating portion 231112 in the thickness direction Y of the electrode plate is less than the smallest dimension of the tab portion 231111 in the thickness direction Y of the electrode plate.

The thickness of the coating portion 231112 is less than the thickness of the tab portion 231111, which can compensate to a certain extent for the dimensional difference in which the thickness of the first region 231121 is greater than the thickness of the second region 231122. This reduces the thickness difference at various positions of the current collector 2311, which is conducive to improving the structural dimensional homogeneity of the current collector 2311 and thereby improving the quality of the electrode plate 231.

In some other embodiments, the thickness of the coating portion 231112 may alternatively be the same as the thickness of the tab portion 231111, which facilitates the provision of the conductive layer 23111 on the insulating layer 23112 and thereby facilitates the manufacturing and molding of the current collector 2311.

In some embodiments, the conductive layer 23111 includes a coating portion 231112, the coating portion 231112 being disposed in the first region 231121; at least a portion of the active substance layer 2313 is applied to a side of the coating portion 231112 facing away from the first region 231121; and a surface of the coating portion 231112 facing away from the first region 231121 and a surface of the tab portion 231111 facing away from the second region 231122 are co-planar.

The surface of the coating portion 231112 facing away from the first region 231121 is a first sub surface 231113, and the surface of the tab portion 231111 facing away from the second region 231122 is a second sub surface 231114. The surface of the coating portion 231112 facing away from the first region 231121 and the surface of the tab portion 231111 facing away from the second region 231122 are co-planar, which means that the first sub surface 231113 and the second sub surface 231114 are co-planar, or, in other words, the first sub surface 231113 and the second sub surface 231114 are located on a same plane. Since the thickness of the second region 231122 is greater than the thickness of the first region 231121 and the surface of the coating portion 231112 facing away from the first region 231121 and the surface of the tab portion 231111 facing away from the second region 231122 are co-planar, the thickness of the tab portion 231111 is greater than the thickness of the coating portion 231112, which is conducive to improving the current flow capability of the tab 2312 of the electrode plate 231.

The surface of the coating portion 231112 facing away from the first region 231121 and the surface of the tab portion 231111 facing away from the second region 231122 are co-planar, so that the surface of the current collector 2311 in the thickness direction Y of the electrode plate is much flatter, facilitating the manufacturing and molding of the current collector 2311.

In some other embodiments, the surface of the coating portion 231112 facing away from the first region 231121 and the surface of the tab portion 231111 facing away from the second region 231122 may alternatively not be co-planar. For example, in an embodiment in which the thickness of the coating portion 231112 is the same as the thickness of the tab portion 231111, the surface of the coating portion 231112 facing away from the first region 231121 and the surface of the tab portion 231111 facing away from the second region 231122 are not co-planar, and in the thickness direction Y of the electrode plate, a distance between the surface (first sub surface 231113) of the coating portion 231112 facing away from the first region 231121 and the surface of the first region 231121 facing the coating portion 231112 is greater than a distance between the surface (second sub surface 231114) of the tab portion 231111 facing away from the surface of the second region 231122 and the surface of the first region 231121 facing the coating portion 231112.

As shown in FIG. 5, in some embodiments, the insulating layer 23112 further includes a first transition zone 231123, the first transition zone 231123 connecting the first region 231121 and the second region 231122, and thickness of the first transition zone 231123 gradually decreasing in a direction from the first region 231121 to the second region 231122; and the conductive layer 23111 further includes a second transition zone 231115, the second transition zone 231115 being disposed in the first transition zone 231123, and thickness of the second transition zone 231115 gradually increasing in the direction from the first region 231121 to the second region 231122.

In the width direction X of the electrode plate, an end of the second transition zone 231115 is connected to the coating portion 231112, and another end of the first transition zone 231123 is connected to the tab portion 231111. The coating portion 231112 and the tab portion 231111 are indirectly connected through the first transition zone 231123.

The coating portion 231112, the tab portion 231111, and the second transition zone 231115 may be provided separately and connected together using a connection process such as bonding connection and fusion connection, to form the conductive layer 23111. The coating portion 231112, the tab portion 231111, and the second transition zone 231115 may alternatively be integrally formed. Materials of the coating portion 231112, the tab portion 231111, and the second transition zone 231115 may be the same or different.

Under the condition that the conductive layer 23111 further includes the second transition zone 231115 and that the active substance layer 2313 is entirely applied in the coating portion 231112, the second transition zone 231115 may also be regarded as a part of the tab portion 231111, such that only a part of the tab portion 231111 is disposed in the second region 231122 and another part of the tab portion 231111 is disposed in the first transition zone 231123 of the insulating layer 23112. In this case, the second transition zone 231115 may or may not be welded to the adapter 24 (shown in FIG. 11).

In the direction from the first region 231121 to the second region 231122, the thickness of the second transition zone 231115 gradually increases. In other words, the second transition zone 231115 has a larger thickness at a position closer to the second region 231122.

In the direction from the first region 231121 to the second region 231122, the thickness of the first transition zone 231123 gradually decreases and the thickness of the second transition zone 231115 gradually increases, which can compensate for the thickness difference of the first transition zone 231123 with respect to the first region 231121 and the second region 231122. This reduces the thickness difference at various positions of the current collector 2311, which is conducive to improving the structural dimensional homogeneity of the current collector 2311 and thereby improving the quality of the electrode plate 231.

In some embodiments, a surface of the second transition zone 231115 facing away from the first transition zone 231123 and a surface of the tab portion 231111 facing away from the second region 231122 are co-planar.

The surface of the second transition zone 231115 facing away from the first transition zone 231123 is a third sub surface 231126, and the surface of the second transition zone 231115 facing away from the first transition zone 231123 and the surface of the tab portion 231111 facing away from the second region 231122 are co-planar, which means that the third sub surface 231126 and the second sub surface 231114 are co-planar, or in other words, the third sub surface 231126 and the second sub surface 231114 are located on a same plane.

The surface of the second transition zone 231115 facing away from the first transition zone 231123 and the surface of the tab portion 231111 facing away from the second region 231122 are co-planar, so that the surface of the current collector 2311 in the thickness direction Y of the electrode plate is much flatter, facilitating the manufacturing and molding of the current collector 2311.

In embodiments in which the surface of the second transition zone 231115 facing away from the first transition zone 231123 and the surface of the tab portion 231111 facing away from the second region 231122 are co-planar, and the surface of the coating portion 231112 facing away from the first region 231121 and the surface of the tab portion 231111 facing away from the second region 231122 may or may not be co-planar.

As shown in FIG. 4 to FIG. 7, in some embodiments, in the width direction X of the electrode plate, two ends of the first region 231121 are connected to the second region 231122.

It can be understood that the electrode plate 231 has tabs 2312 formed at two ends in its width direction. Two second regions 231122 are connected to two ends of the first region 231121 in the width direction X of the electrode plate, respectively. The two second regions 231122 may be connected to the first region 231121 in a same way. For example, the two second regions 231122 are directly connected to the two ends of the first region 231121 in the width direction X of the electrode plate, respectively, or the two second regions 231122 are indirectly connected to the first region 231121 through the first transition zone 231123, respectively, which facilitates the manufacturing and molding of the current collector 2311.

The two second regions 231122 may alternatively be connected to the first region 231121 in different ways. For example, one of the two second regions 231122 is directly connected to an end of the first region 231121, and the other of the two second regions 231122 is indirectly connected to another end of the first region 231121 through the first transition zone 231123, which can form two tabs 2312 of different forms, enabling the electrode plate 231 to meet different usage requirements.

In the width direction X of the electrode plate, two ends of the first region 231121 are connected to the second region 231122, so that in manufacturing of the electrode plate 231, the current collector 2311 can be cut in the middle to synchronously manufacture two electrode plates 231, which is conducive to improving the production efficiency of preparing the electrode plate 231.

Figure 8:
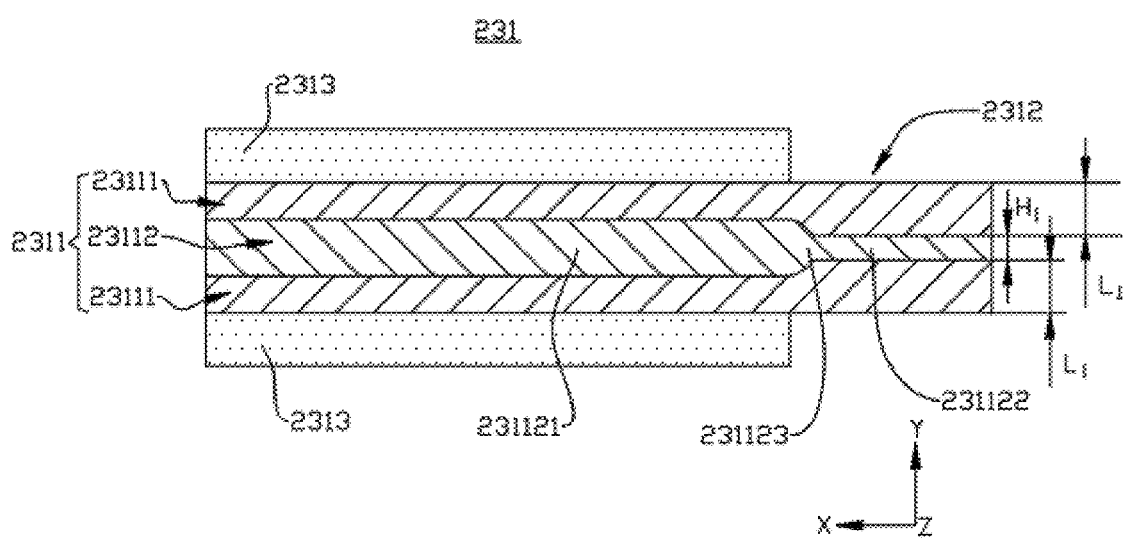
FIG. 8 is a schematic structural diagram of an electrode plate according to some other embodiments of this application.
Figure 9:
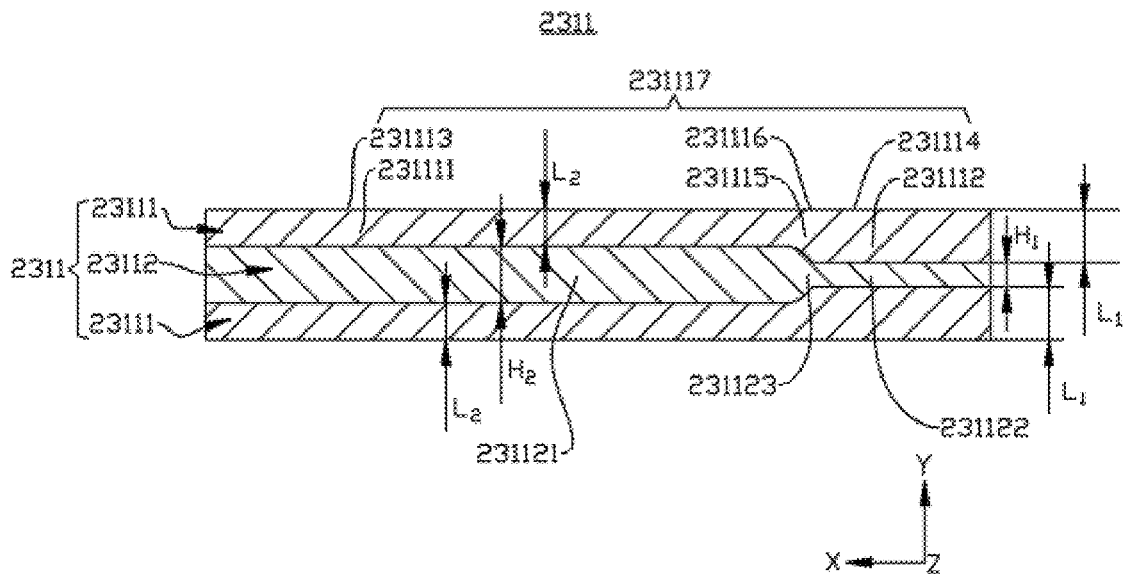
FIG. 9 is a schematic structural diagram of a current collector of the electrode plate in FIG. 8.
Figure 10:
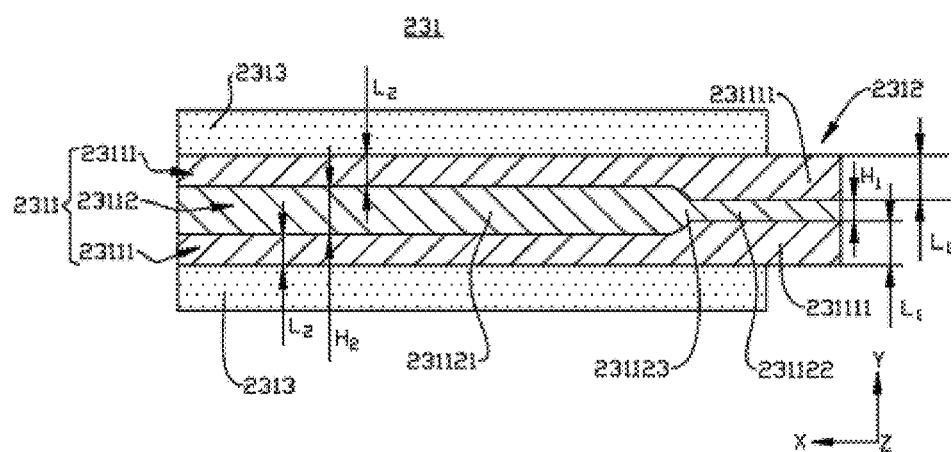
FIG. 10 is a schematic structural diagram of an electrode plate according to yet some other embodiments of this application.

Certainly, as shown in FIG. 8 and FIG. 9, in some other embodiments, in the width direction X of the electrode plate, an end of the first region 231121 is connected to the second region 231122.

As shown in FIG. 5, FIG. 6, FIG. 7, and FIG. 9, in some embodiments, the conductive layer 23111 has a first surface 231117 facing away from the insulating layer 23112, the first surface 231117 extending to two ends of the current collector 2311 along the width direction X of the electrode plate; and in the thickness direction Y of the electrode plate, the first surfaces 231117 of the conductive layers 23111 at the two opposite sides of the insulating layer 23112 are parallel.

The first surface 231117 includes a first sub surface 231113 and a second sub surface 231114, the first sub surface 231113 and the second sub surface 231114 being co-planar. In an embodiment in which the conductive layer 23111 further includes a second transition zone 231115, the first surface 231117 includes a first sub surface 231113, a second sub surface 231114, and a third sub surface 231126, the first sub surface 231113, the second sub surface 231114, and the third sub surface 231126 being co-planar and together forming the first surface 231117.

As shown in FIG. 5, FIG. 6, and FIG. 7, in an embodiment in which in the width direction X of the electrode plate, the second region 231122 is provided at two ends of the first region 231121, in the width direction X of the electrode plate, an edge, facing away from the second sub surface 231114, of the first sub surface 231113 of the tab portion 231111 disposed in a second region 231122 forms an edge of the first surface 231117, and an edge, facing away from the second sub surface 231114, of the first sub surface 231113 of the tab portion 231111 disposed in another second region 231122 forms another edge of the first surface 231117.

As shown in FIG. 9, in an embodiment in which in the width direction X of the electrode plate, the second region 231122 is provided at only an end of the first region 231121, in the width direction X of the electrode plate, an edge, facing away from the second sub surface 231114, of the first sub surface 231113 forms an edge of the first surface 231117, and an edge, facing away from the first sub surface 231113, of the second sub surface 231114 forms another edge of the first surface 231117.

The conductive layer 23111 has a first surface 231117 facing away from the insulating layer 23112, the first surface 231117 extending to two ends of the current collector 2311 along the width direction X of the electrode plate, which means that the first surface 231117 is planar, facilitating the manufacturing and molding and facilitating the application of the active substance layer 2313 on the first surface 231117, thereby facilitating the manufacturing and molding of the electrode plate 231. The first surfaces 231117 of the conductive layers 23111 at the two opposite sides of the insulating layer 23112 are parallel, and the current collector 2311 is an equal-thickness structure, facilitating the manufacturing and molding of the current collector 2311.

In some embodiments, the conductive layer 23111 further includes a coating portion 231112, the coating portion 231112 being disposed in the first region 231121, and in the thickness direction Y of the electrode plate, an active substance layer 2313 is provided on a side of the coating portion 231112, facing away from the insulating layer 23112, of the conductive layer 23111 at two sides of the insulating layer 23112.

The active substance layer 2313 is applied to the surface of the coating portion 231112 facing away from the first region 231121, which means that the active substance layer 2313 is applied to the first sub surface 231113. It is possible that the coating portions 231112 of two conductive layers 23111 are provided with the active substance layer 2313.

The active substance layer 2313 is provided on a side of the coating portion 231112, facing away from the insulating layer, of the conductive layer 23111 at the two sides of the insulating layer 23112, which increases the amount of active substance of the electrode plate 231 and is conducive to increasing the energy density of the battery 100 or battery cell 20 having the electrode plate 231.

In some other embodiments, the active substance layer 2313 can alternatively be applied at the coating portion 231112 of only one conductive layer 23111.

In some embodiments, as shown in FIG. 4 and FIG. 8, a projection of the active substance layer 2313 and a projection of the second region 231122 do not overlap when viewed from the thickness direction Y of the electrode plate.

In the thickness direction Y of the electrode plate, the projection of the active substance layer 2313 refers to a projection of the active substance layer 2313 on a plane perpendicular to the thickness direction Y of the electrode plate. In the thickness direction Y of the electrode plate, the projection of the second region 231122 refers to a projection of the second region 231122 on a plane perpendicular to the thickness direction Y of the electrode plate.

It can be understood that the active substance layer 2313 is entirely applied to the coating portion 231112 of the conductive layer 23111, so that when the tab portion 231111 is welded, in the width direction X of the electrode plate, a spacing can be formed between a welding location and the active substance layer 2313, which can mitigate the risk of high-temperature damage to the active substance layer 2313 during welding.

Figure 11:
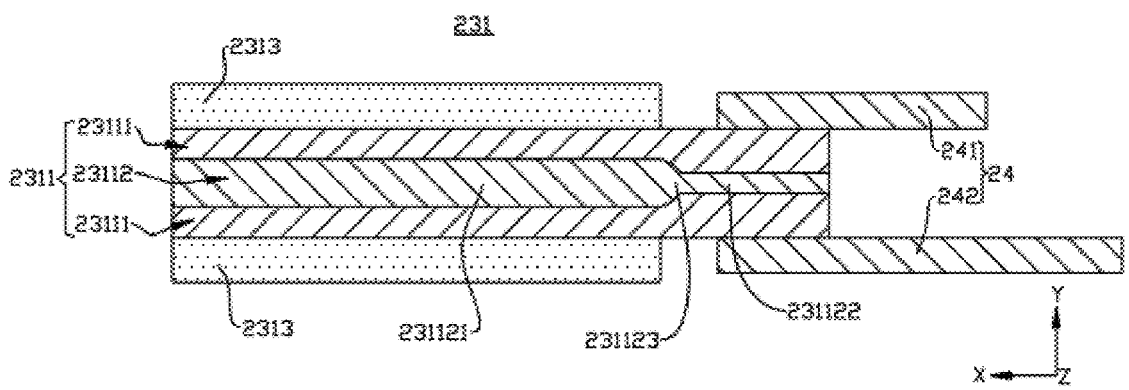
FIG. 11 is a schematic diagram of connection between a tab and an adapter according to some embodiments of this application.

As shown in FIG. 11, in some other embodiments, when viewed from the thickness direction Y of the electrode plate, the projection of the active substance layer 2313 and the projection of the second region 231122 overlap.

It can be understood that a portion of the active substance layer 2313 is applied to the coating portion 231112 of the conductive layer 23111, and that another portion thereof extending along the width direction X of the electrode plate to the conductive layer 23111 is applied in the second region 231122.

In an embodiment in which the insulating layer 23112 includes a first transition zone 231123, the conductive layer 23111 includes a second transition zone 231115, and in the width direction X of the electrode plate, the active substance layer 2313 covers the first transition zone 231123 and extends to overlap the second region 231122.

The projection of the active substance layer 2313 overlaps the projection of the second region 231122 in the thickness direction Y of the electrode plate, and in the width direction X of the electrode plate, the active substance layer 2313 covers as much of the conductive layer 23111 as possible, which increases the amount of the active substance layer 2313 of the electrode plate 231 and is conducive to increasing the energy density of the battery 100 or battery cell 20.

As shown in FIG. 5, FIG. 6, FIG. 9, and FIG. 10, in some embodiments, thickness $H_1$ of the second region 231122 and thickness $L_1$ of the tab portion 231111 satisfy $H_1/L_1 \leq 5$.

As shown in FIG. 5, FIG. 6, FIG. 9, and FIG. 10, the second region 231122 is an equal-thickness structure, and the thickness of the second region 231122 is a dimension of the second region 231122 in the thickness direction Y of the electrode plate. The tab portion 231111 is an equal-thickness structure, and the thickness of the tab portion 231111 is a dimension of the tab portion 231111 in the thickness direction Y of the electrode plate.

$H_1/L_1$ may be 0.5, 1, 1.5, 2, 2.5, 3, 3.5, 4, 4.5, 5, or the like.

If $H_1/L_1 > 5$, an area of welding residue during welding of individual tab portions 231111 is relatively small, resulting in relatively poor welding stability and less likelihood of false welding. Therefore, $H_1/L_1 \leq 5$, so that a relatively large area of welding residue can be left between two tab portions 231111 after tab portions 231111 at two sides of the second region 231122 are welded, which makes the welding more stable and reduces the risk of welding quality issues such as false welding.

It should be noted that the area of welding residue refers to a proportion of the area of residue in welding of the adapter in an entire welding area after the welding is completed. The area of welding residue on the adapter may be manually and visually inspected after the welding tension was measured using a tension meter, where the welding tension can be greater than or equal to 100 N. Generally, the area of welding residue is required to be greater than or equal to 50% to meet the basic requirements of use, but in actual production, the area of welding residue needs to be greater than or equal to 80% to meet the acceptance criteria. Data in Table 1 is obtained.

still falls below the actual production acceptance criteria. When $H_1/L_1$ is 0.1, 0.2, 0.5, 0.7, 0.9, 0.2, and 1, the area of welding residue reaches 80% or more, meeting the actual production acceptance criteria.

Therefore, in some embodiments, $H_1/L_1 \leq 1$.

$H_1/L_1$ may be 0.1, 0.2, 0.3, 0.4, 0.5, 0.6, 0.7, 0.8, 0.9, 1, or the like.

$H_1/L_1 \leq 1$, so that a larger area of welding residue is present after tab portions 231111 are welded, which further enhances the welding stability and further reduces the risk of welding quality issues such as false welding.

The thickness $H_1$ of the second region 231122 may have different values according to actual requirements. In some embodiments, $H_1 \leq 15$ μm. For example, $H_1$ may be 1 μm, 3 μm, 5 μm, 7 μm, 9 μm, 11 μm, 13 μm, 15 μm, or the like.

If $H_1 > 15$ μm, the thickness of the second region 231122 is large, which is not conducive to the welding of the two tab portions 231111 at two sides of the second region 231122, and furthermore, the thickness of the first region 231121 is greater than the thickness of the second region 231122. If $H_1 > 15$ μm, the thicknesses of both the second region 231122 and the first region 231121 are large, resulting in a large overall thickness of the current collector 2311, which is not conducive for a cell with the electrode plate 231 prepared using the current collector 2311 and the electrode assembly 23 thus formed to have high energy density. Therefore, if $H_1 \leq 15$ μm, a reduced thickness of the current collector 2311 is conducive for the cell with the electrode plate 231 prepared using the current collector 2311 and the electrode assembly 23 thus formed to have high energy density.

In some embodiments, $H_1 \leq 5$ μm. For example, $H_1$ may be 0.5 μm, 1.5 μm, 2 μm, 2.5 μm, 4 μm, 4.5 μm, 5 μm, or the like.

The thickness $L_1$ of the tab portion 231111 may have different values according to actual requirements. In some

TABLE 1

| $H_1/L_1$ | 0.1 | 0.2 | 0.5 | 0.7 | 0.9 | 1 | 1.2 | 1.5 | 1.7 | 1.9 | 2 | 2.2 | 2.5 | 2.7 | 3 |
|---|---|---|---|---|---|---|---|---|---|---|---|---|---|---|---|
| Area of welding residue (%) | 80 | 85 | 85 | 80 | 85 | 80 | 70 | 70 | 70 | 75 | 65 | 60 | 65 | 65 | 60 |
| $H_1/L_1$ | 3.2 | 3.5 | 3.7 | 3.9 | 4 | 4.2 | 4.5 | 4.7 | 4.9 | 5 | 5.2 | 5.5 | 5.7 | 6 | |
| Area of welding residue (%) | 65 | 55 | 55 | 50 | 55 | 55 | 50 | 55 | 50 | 50 | 40 | 40 | 35 | 35 | |

As shown in Table 1, when $H_1/L_1$ is 5.2, 5.5, 5.7, and 5, the area of welding residue is less than 50%, so the battery cells 20 produced cannot meet the basic requirements of use. When $H_1/L_1$ is 0.1, 0.2, 0.5, 0.7, 0.9, 0.2, 1, 1.2, 1.5, 1.7, 1.9, 2, 2.2, 2.5, 2.7, 3, 3.2, 3.5, 3.7, 3.9, 4, 4.2, 4.5, 4.7, and 4.9, the area of welding residue is greater than 50%, so the battery cells 20 produced can meet the basic requirements of use. Therefore, $H_1/L_1 \leq 5$, so that a relatively large area of welding residue can be left between two tab portions 231111 after tab portions 231111 at two sides of the second region 231122 are welded, which makes the welding more stable and reduces the risk of welding quality issues such as false welding, so that the battery cells 20 meet the requirements of use.

Still referring to Table 1, when $H_1/L_1$ is 1.2, 1.5, 1.7, 1.9, 2, 2.2, 2.5, 2.7, 3, 3.2, 3.5, 3.7, 3.9, 4, 4.2, 4.5, 4.7, and 4.9, the area of welding residue, although also relatively large, embodiments, 0.1 μm $\leq L_1 \leq$ 10 μm. For example, $L_1$ may be 0.1 μm, 1 μm, 2 μm, 3 μm, 4 μm, 5 μm, 6 μm, 7 μm, 8 μm, 9 μm, 10 μm, or the like.

If $L_1 \leq 0.1$ μm, the tab portion 231111 may not satisfy the current flow demand, and if $L_1 > 10$ μm, the tab portion 231111 has a larger thickness, making the current collector 2311 thicker. 0.1 μm $\leq L_1 \leq$ 10 μm, so that the tab portion 231111 can have a better current flow capability and the thickness of the current collector 2311 is controlled in a reasonable range.

In some embodiments, 2 μm $\leq L_1 \leq$ 4 μm. For example, $L_1$ may be 2 μm, 2.2 μm, 2.5 μm, 2.7 μm, 3.2 μm, 3.5 μm, 3.7 μm, 3.9 μm, 4 μm, or the like.

As shown in FIG. 5, FIG. 6, FIG. 7, FIG. 9, and FIG. 10, in some embodiments, the conductive layer 23111 further includes a coating portion 231112, the coating portion 231112 being disposed in a first region 231121, and thickness $H_2$ of the first region 231121 and thickness $L_2$ of the coating portion 231112 satisfy $1 \leq H_2/L_2 \leq 50$.

As shown in FIG. 5, FIG. 6, FIG. 7, FIG. 9, and FIG. 10, the first region 231121 is an equal-thickness structure, and the thickness of the first region 231121 is a dimension of the first region 231121 in the thickness direction Y of the electrode plate. The coating portion 231112 is an equal-thickness structure, and the thickness of the coating portion 231112 is a dimension of the tab portion 231111 in the thickness direction Y of the electrode plate.

$H_2/L_2$ may be 1, 5, 10, 15, 20, 25, 30, 35, 40, 45, 50, or the like.

If $H_2/L_2 \leq 1$, under the condition that the thickness of the current collector 2311 is constant, the thickness of the first region 231121 is smaller with respect to the thickness of the coating portion 231112, which makes the portion of the current collector 2311 including the first region 231121 have a weak strength. If $H_2/L_2 > 50$, the thickness of the coating portion 231112 is smaller with respect to the thickness of the first region 231121, and it is difficult to make the conductive layer 23111 have a high current flow capability under the condition that the thickness of the current collector 2311 is constant. Therefore, $1 \leq H_2 L_2 \leq 50$, so that the current collector 2311 has a good strength and the conductive layer 23111 has a good current flow capability.

In some embodiments, $2 \leq H_2/L_2 \leq 20$.

For example, $H_2/L_2$ may be 2, 3, 4, 6, 7, 9, 11, 13, 16, 17, 18, 19, 20, or the like.

$2 \leq H_2 L_2 \leq 20$, so that the current collector 2311 has a better strength and the conductive layer 23111 has a better current flow capability.

The thickness $H_2$ of the first region 231121 may have different values according to actual requirements. In some embodiments, 1 μm $\leq H_2 \leq$ 20 μm. For example, $H_2$ may be 1 μm, 2 μm, 3 μm, 5 μm, 6 μm, 9 μm, 10 μm, 13 μm, 15 μm, 17 μm, 20 μm, or the like.

If $H_2 < 1$ μm, the first region 231121 has a low strength, and if $H_2 > 20$ μm, the first region 231121 has a larger thickness, making the current collector 2311 thicker. 1 μm $\leq H_2 \leq$ 20 μm, so that the first region 231121 has a better strength and the thickness of the current collector 2311 is controlled in a reasonable range.

In some embodiments, 3 μm $\leq H_2 \leq$ 14 μm.

For example, $H_2$ may be 3 μm, 4 μm, 7 μm, 8 μm, 11 μm, 11.5 μm, 12 μm, 13.5 μm, 14 μm, or the like.

The thickness $L_2$ of the coating portion 231112 may have different values according to actual requirements. In some embodiments, 0.1 μm $\leq L_2 \leq$ 10 μm. For example, $L_2$ may be 0.1 μm, 1 μm, 2 μm, 3 μm, 4 μm, 5 μm, 6 μm, 7 μm, 8 μm, 9 μm, 10 μm, or the like.

If $L_2 < 0.1$ μm, the coating portion 231112 has a small current flow capability and may not meet the requirements of use, and if $L_2 > 10$ μm, the coating portion 231112 has a larger thickness, making the current collector 2311 thicker. 0.1 μm $\leq L_2 \leq$ 20 μm, so that the coating portion 231112 has a better current flow capability and the thickness of the current collector 2311 is controlled in a reasonable range.

In some embodiments, 0.5 μm $\leq L_2 \leq$ 5 μm. For example, $L_2$ may be 0.5 μm, 1.5 μm, 2.5 μm, 3.5 μm, 4.5 μm, 5 μm, or the like.

An embodiment of this application further provides an electrode assembly 23, the electrode assembly 23 including the electrode plate 231 provided in any one of the foregoing embodiments.

The electrode assembly 23 includes two electrode plates 231 with opposite polarities, and the electrode plate 231 provided in any one of the foregoing embodiments may be a positive electrode plate or a negative electrode plate of the electrode assembly 23. It is also possible that the two electrode plates 231 with opposite polarities use the electrode plates 231 provided in any one of the foregoing embodiments.

The tab portions 231111 at the two sides of the second region 231122 are more easily welded due to the smaller thickness of the second region 231122 of the insulating layer 23112 of the electrode plate 231 provided in any one of the foregoing embodiments, thereby reducing welding difficulty, and mitigating the risk caused by welding quality issues such as false welding of the tab portions 231111 due to the presence of the insulating layer 23112, which is conducive to the improvement in the welding quality of the individual tab portions 231111 of the electrode assembly 23 having the electrode plate 231.

In some embodiments, the electrode assembly 23 includes two electrode plates 231 according to any one of the foregoing embodiments with the two electrode plates 231 having opposite polarities.

That is, both the positive electrode plate and the negative electrode plate of the electrode assembly 23 use the plates 231 provided in any one of the foregoing embodiments.

The tab portions 231111 at the two sides of the second region 231122 are more easily welded due to the smaller thickness of the second region 231122 of the insulating layer 23112 of the electrode plate 231 provided in any one of the foregoing embodiments, thereby reducing welding difficulty, and mitigating the risk caused by welding quality issues such as false welding of the tab portions 231111 due to the presence of the insulating layer 23112. The two electrode plates 231 of the electrode assembly 23 with opposite polarities are both the electrode plates 231 provided in any one of the foregoing embodiments, so that the individual tab portions 231111 of the electrode assembly 23 establish a relatively stable electrical connection with one another.

An embodiment of this application further provides a battery cell 20, the battery cell 20 including the electrode assembly 23 provided in any one of the foregoing embodiments.

The welding of the tab portions 231111 of the electrode assembly 23 provided in any one of the foregoing embodiments can establish a stable electrical connection, thereby facilitating stable charging and discharging of the battery cell 20 and improving the reliability of the battery cell 20.

Figure 12:
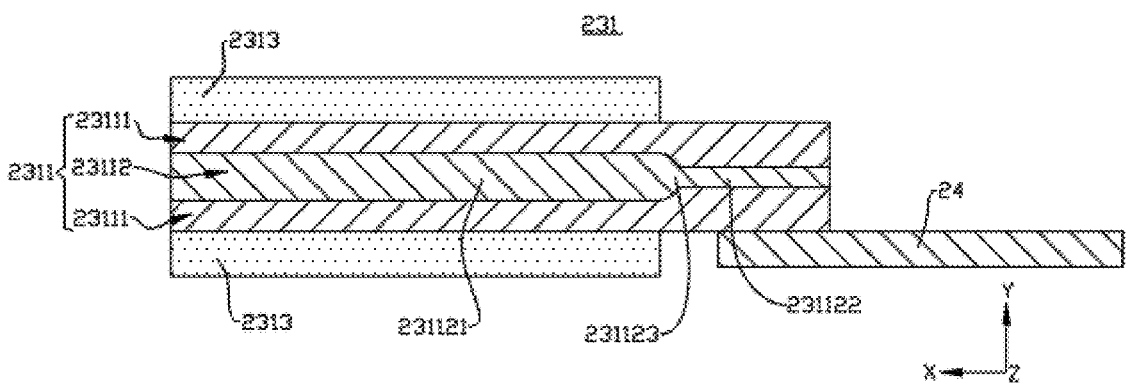
FIG. 12 is a schematic diagram of connection between a tab and an adapter according to some other embodiments of this application.

As shown in FIG. 11 and FIG. 12, in some embodiments, the battery cell 20 further includes an adapter 24, where in the thickness direction Y of the electrode plate, the tab portions 231111 of the conductive layer 23111 located at two sides of the second region 231122 are welded to the adapter 24.

The adapter 24 is disposed on a side of the tab portion 231111 facing away from the second region 231122. After the adapter 24 is welded to the tab portion 231111, the tab portions 231111 of the conductive layer 23111 disposed at two sides of the second region 231122 are electrically connected, and electrodes corresponding to the tab portions 231111 are led out through the adapter 24.

Each tab 2312 may be correspondingly provided with an adapter 24. After the adapter 24 is welded to the corresponding tab 2312, the tab portions 231111 of that tab 2312 at two sides of the second region 231122 are electrically connected. The adapters 24 corresponding to the individual tab 2312 are then welded, thereby establishing electrical connections in the individual tabs 2312 to lead out of the electrodes.

It is possible to weld the tabs 2312 with a same polarity as a whole to an adapter 24, the tab portions 231111 of the individual tabs 2312 are all electrically connected to the adapter 24, and the electrodes are led out through the adapter 24.

The adapter 24 may have various structural forms. As shown in FIG. 11, in some embodiments, the adapter 24 includes a first sub adapter 241 and a second sub adapter 242. The first sub adapter 241 is located at a side of the tab portion 231111 of one of the two conductive layers 23111 facing away from the insulating layer 23112 and is welded to that tab portion 231111, and the second sub adapter 242 is located at a side of the tab portion 231111 of the other of the two conductive layers 23111 facing away from the insulating layer 23112 and is welded to that tab portion 231111. In the width direction X of the electrode plate, the length of the first sub adapter 241 is less than the length of the second sub adapter 242.

After the first sub adapter 241 and the second sub adapter 242 are welded to the corresponding tab portions 231111, respectively, the two tab portions 231111 are electrically connected, which is conducive to improving the current flow capability.

Certainly, as shown in FIG. 12, in some other embodiments, the adapter 24 may alternatively be only a portion. For example, the adapter 24 includes only the first sub adapter 241 or the second sub adapter 242.

In the width direction X of the electrode plate, an end of the adapter 24 closest to the active substance layer 2313 may abut against the active substance layer 2313, so that a larger welding area is provided when the adapter 24 is welded to the tab portion 231111, thereby improving welding stability. In the width direction X of the electrode plate, a gap may alternatively be formed between the active substance layer 2313 and the end of the adapter 24 closest to the active substance layer 2313, to reduce the risk of high-temperature damage to the active substance layer 2313 during welding.

The tab portions 231111 of the conductive layer 23111 located at the two sides of the second region 231122 are welded to the adapter 24, thereby achieving electrical connection between the tab portions 231111 at the two sides of the second region 231122. It can be understood that the tab portions 231111 at the two sides of the second region 231122 are all electrically connected to the adapter, and the electrodes of the battery cell 20 are led out through the adapter 24, which facilitates charging and discharging of the battery cell 20.

An embodiment of this application further provides a battery 100, the battery 100 including the battery cell 20 provided in any one of the foregoing embodiments.

The battery 100 may include one or more battery cells 20. In an embodiment in which the battery 100 includes a plurality of battery cells 20, the plurality of battery cells 20 are electrically connected to each other, and the plurality of battery cells 20 may be connected in series, parallel, or series-parallel.

The welding of the tab portions 231111 of the electrode assembly 23 of the battery cell 20 provided in any one of the foregoing embodiments can establish a stable electrical connection, thereby facilitating stable charging and discharging of the battery cell 20 and improving the reliability of the battery 100 having the battery cell 20.

An embodiment of this application further provides an electric device, the electric device including the battery cell 100 provided in any one of the foregoing embodiments.

The battery 100 provided in the foregoing embodiments has better reliability, which is conducive to improving the reliability of power consumption of the electric device powered by the battery 100.

An embodiment of this application provides an electrode plate 231, the electrode plate 231 including a current collector 2311 and an active substance layer 2313. The current collector 2311 includes an insulating layer 23112 and two conductive layers 23111. In thickness direction Y of the electrode plate, the two conductive layers 23111 are disposed at two sides of the insulating layer 23112, respectively. The insulating layer 23112 includes a first region 231121, a second region 231122, and a first transition zone 231123. In width direction X of the electrode plate, two ends of the first transition zone 231123 are connected to the first region 231121 and the second region 231122, respectively, and the second region 231122 is provided at one side of the first region 231121. The first region 231121 is an equal-thickness structure, the second region 231122 is an equal-thickness structure, and thickness of the first region 231121 is greater than thickness of the second region 231122. The thickness of the first transition zone 231123 gradually decreases in a direction from the first region 231121 to the second region 231122.

The conductive layer 23111 includes a tab portion 231111, a coating portion 231112, and a second transition zone 231115. In width direction X of the electrode plate, two ends of the second transition zone 231115 are connected to the tab portion 231111 and the coating portion 231112, respectively. The coating portion 231112 is disposed in the first region 231121, the tab portion 231111 is disposed in the second region 231122, and the second transition zone 231115 is disposed in the first transition zone 231123. The coating portion 231112 is an equal-thickness structure, the tab portion 231111 is an equal-thickness structure, and the thickness of the tab portion 231111 is greater than the thickness of the coating portion 231112. The thickness of the second transition zone 231115 gradually increases in a direction from the first region 231121 to the second region 231122. The electrode plate 231 is an equal-thickness structure. The first sub surface 231113 of the coating portion 231112 of each conductive layer 23111 facing away from the first region 231121, the second sub surface 231114 of the tab portion 231111 facing away from the second region 231122, and the third sub surface 231126 of the second transition zone 231115 facing away from the first transition zone 231123 are co-planar and together form the first surface 231117 of the current collector 2311 in the thickness direction Y of the electrode plate. The active substance layer 2313 is disposed on a side of the coating portion 231112 facing away from the first region 231121.

The foregoing descriptions are merely some embodiments of this application which are not intended to limit this application. Persons skilled in the art understand that this application may have various modifications and variations. Any modifications, equivalent replacements, and improvements made without departing from the spirit and principle of this application shall fall within the protection scope of this application.

What is claimed is:
1. An electrode plate, comprising:
   a current collector comprising a conductive layer and an insulating layer, wherein:
   in thickness direction of the electrode plate, the conductive layer is provided at two opposite sides of the insulating layer;

the insulating layer comprises a first region and a second region, thickness of the second region being less than thickness of the first region, and in width direction of the electrode plate, at least one end of the first region being connected to the second region; and the conductive layer comprises a tab portion, the tab portion being at least partially A disposed in the second region;

an active substance layer applied on a surface of the conductive layer facing away from the insulating layer, the tab portion being not coated with the active substance layer;

the conductive layer comprises a coating portion, the coating portion being disposed in the first region;

at least a portion of the active substance layer is applied to a side of the coating portion facing away from the first region; and a surface of the coating portion facing away from the first region and a surface of the tab portion facing away from the second region are co-planar.

2. The electrode plate according to claim 1, wherein the insulating layer further comprises a first transition zone, the first transition zone connecting the first region and the second region, and thickness of the first transition zone gradually decreasing in a direction from the first region to the second region.

3. The electrode plate according to claim 1, wherein:
the conductive layer further comprises a coating portion, the coating portion being disposed in the first region;
at least a portion of the active substance layer is applied to a side of the coating portion facing away from the first region; and
thickness of the coating portion is less than thickness of the tab portion.

4. The electrode plate according to claim 1, wherein:
the insulating layer further comprises a first transition zone, the first transition zone connecting the first region and the second region, and thickness of the first transition zone gradually decreasing in a direction from the first region to the second region; and
the conductive layer further comprises a second transition zone, the second transition zone being disposed in the first transition zone, and thickness of the second transition zone gradually increasing in the direction from the first region to the second region.

5. The electrode plate according to claim 4, wherein a surface of the second transition zone facing away from the first transition zone and a surface of the tab portion facing away from the second region are co-planar.

6. The electrode plate according to claim 1, wherein in the width direction of the electrode plate, two ends of the first region are connected to the second region.

7. The electrode plate according to claim 1, wherein:
the conductive layer has a first surface facing away from the insulating layer, the first surface extending to two ends of the current collector along the width direction of the electrode plate; and
in the thickness direction of the electrode plate, the first surfaces of the conductive layers at the two opposite sides of the insulating layer are parallel.

8. The electrode plate according to claim 1, wherein the conductive layer further comprises a coating portion, the coating portion being disposed in the first region, and in the thickness direction of the electrode plate, the active substance layer is provided on a side of the coating portion, facing away from the insulating layer, of the conductive layer at the two sides of the insulating layer.

9. The electrode plate according to claim 1, wherein when viewed from the thickness direction of the electrode plate, a projection of the active substance layer overlaps a projection of the second region.

10. The electrode plate according to claim 1, wherein thickness $H_1$ of the second region and thickness $L_1$ of the tab portion satisfy $H_1/L_1 \leq 5$.

11. The electrode plate according to claim 10, wherein $H_1/L_1 \leq 1$.

12. The electrode plate according to claim 1, wherein the conductive layer further comprises a coating portion, the coating portion being disposed in the first region, and thickness $H_2$ of the first region and thickness $L_2$ of the coating portion satisfy $1 \leq H_2/L_2 \leq 50$.

13. The electrode plate according to claim 12, wherein $2 \leq H_2/L_2 \leq 20$.

14. An electrode assembly comprising the electrode plate according to claim 1.

15. The electrode assembly according to claim 14, wherein the electrode plate is one of two electrode plates having opposite polarities.

16. A battery cell comprising the electrode assembly according to claim 14.

17. The battery cell according to claim 16, further comprising:
an adapter;
wherein in thickness direction of the electrode plate, the tab portions of the conductive layer located at two sides of the second region are welded to the adapter.

18. A battery comprising the battery cell according to claim 16.

19. An electric device comprising the battery according to claim 18.

* * * * *